United States Patent Office 3,305,460
Patented Feb. 21, 1967

3,305,460
METHOD OF ELECTROPLATING PLASTIC ARTICLES
Robert M. Lacy, Anchorage, Ky., assignor to General Electric Company, a corporation of New York
No Drawing. Filed Jan. 23, 1964, Ser. No. 339,603
3 Claims. (Cl. 204—20)

The present invention reates to a method for electroplating plastic articles such as smooth surfaced articles molded from phenolic resins, melamine resins, styrene-acrylonitrile copolymers, acrylonitrile-butadiene-styrene copolymers and the like.

As plastics and particular thermoplastics can be readily fabricated into intricate configurations with a smooth surface finish, many articles such as buttons, knobs, handles and the like are molded from such plastic materials. Because of the relatively low cost of such plastic parts, they have frequently been proposed as substitutes for metal parts such as zinc die castings in the manufacture of metal plated articles or parts. However, due to the difficulty of obtaining good adhesion between the smooth plastic surface and the metal coating, it has not heretofore been possible to produce metal coated plastic parts or articles in which the as-molded smooth plastic surface is retained in the metal coating and is in fact utilized in providing the desired smooth surface in that coating. More specifically, to provide some degree of bonding between the electroplate and the plastic surface, prior processes have generally required a roughening of the plastic surface by grit blasting, treatment with a suitable surface deglazing agent or the like to provide a mechanically roughened surface that will provide a weak physical bond between the plastic substrate and the deposited metal. Such processes have the disadvantage of destroying the smooth molded plastic surface so that in order to provide a bright surface on the plated article, the electro-deposited metal surface must be mechanically buffed or polished. Such mechanical bonding processes have therefore required the laying down of extremely thick metal films on the order of 0.005 to 0.008 inch in order to overcome the limitations of the weak mechanical bond and to provide metal layers of sufficient thickness to allow for the mechanical buffing and polishing necessary to attain the requisite surface smoothness and brilliance in the final product. This has required long plating times and rather costly plating installations.

To avoid the destruction of the smooth molded plastic surface resulting from the sandblasting or depolishing thereof to achieve the mechanical interlocking of the metallic film with the surface, various adhesive layers have been proposed for bonding the metal layer to the smooth plastic surface. However, prior art processes of this type have involved the use of adhesive layers of the so-called "thermo-setting" type. For example, the plastic surface has been coated with an adhesive film which was partially cured to an intermediate or tacky B stage, a conductive metal film was then applied using conventional electroplating techniques after which the entire plated part was heated to cure or thermoset the adhesive. While the use of such adhesives have in some cases resulted in a bright metal coating when applied to a smooth plastic surface, it has been found that thermosetting adhesives, while having good adherence in general for the plastic surface, have provided only very weak adhesion to the metal surface after curing to the final thermoset stage.

An object of the present invention is to provide a dependable and low cost process for metal coating a plastic article in which the metal coating has a high degree of adherence to the plastic surface without the need for sandblasting or otherwise roughening the plastic surface.

Another object of the present invention is to provide a process for applying a relatively thin, adherent, bright, electro-deposited metal coating to a molded plastic article, which coating exhibits or reflects the original smooth finish of the plastic base.

Further objects and advantages of the invention will become apparent from the following description and the features of novelty which characterize the invention will be pointed out with particularity in the claims annexed to and forming part of this specification.

In accordance with the present invention, metal coated plastic articles in which the readily produced smooth surface of a molded plastic is retained and reflected in the metal coating are produced by a process which comprises applying to the cleaned, as-molded surface of a plastic article a thin thermoplastic adhesive layer essentially consisting of an acrylonitrile-butadiene copolymer, a carboxy-modified acrylonitrile-butadiene copolymer, a non-curing phenolic resin and an inorganic filler. The thin coating which way be applied by spraying or dipping or by any other suitable technique is warmed to a temperature sufficient to remove most or all of the solvent from the thermoplastic adhesive and to create a bond to the plastic surface. A thin conductive film of copper is then applied to the adhesive coating using well-known plating techniques for applying a layer of electro-deposited metal of a non-conductive surface. This thin film is then increased in thickness by plating in a conventional electroplating bath. After rinsing and drying the metal coating, the plated article is subjected to a second heat treatment at an elevated temperature slightly below that used for removal of the solvent followed by the application of a finish metallic film, such as nickel and chromium, which is electroplated on the copper layer using conventional techniques.

Numerous tests have shown that the adhesive layer containing an acrylonitrile-butadiene copolymer, a carboxylic-butadiene-acrylonitrile copolymer, a non-curing phenol-formaldehyde resin plus a substantial proportion of an inorganic filler, when applied in the form of a thin adhesive layer, is essential in the production of a metal coated plastic part in which the metal finish duplicates or reflects the smooth finish of the plastic surface. By the use of this adhesive, a relatively high bonding is obtained to both the smooth plastic surface and to the metal coating whereas only very weak or substantially no bonding to the metal layer is obtained with other adhesive systems comprising various thermosetting or heat-reactive phenolic resins, epoxy resins, vinyl resins and modified phenolic, vinyl and epoxy resins.

More specifically, it has been found that the adhesive layer should be laid down from a solution of about 2 parts by weight of carboxy-modified acrylonitrile-butadiene copolymer resin, one to three parts, preferably two parts, by weight of an acrylonitrile-butadiene copolymer resin, one to two parts of the phenolic resins, and about one part filler for each two to four parts of the combined resins. Any suitable solvent or solvent mixture for the resins which readily evaporates at temperatures below about 100° C.–125° C. may be employed. Methyl ethyl ketone and methyl isobutyl ketone are preferred solvents which may be modified by the addition of toluene, isopropanol or the like to alter the evaporation rate in order to facilitate the application of the adhesive film by spraying, dipping, brushing or equivalent means.

It appears that the carboxy-modified acrylonitrile-butadiene copolymer provides the desired adhesion of the adhesive layer to metal while the straight acrylonitrile-butadiene copolymer provides the necessary resistance to the copper plating baths employed in forming the copper layer. Both of these adhesive components provide adhesion to the plastic surface.

While various fillers may be employed, it has been found that titanium dioxide is particularly useful and the presence of a filler has been found essential to increase the cohesive strength of the adhesive film and to provide a film or layer which has a thermal coefficient of expansion between that of the usual plastic and the metal layer and also to reduce the shrinkage of the film during removal of the solvent therefrom.

The prebake of the adhesive film, that is, the baking of this film prior to application of the electroplated copper or equivalent layer is primarily employed to remove most of the solvent from the thermoplastic adhesive and to develop a firm bond of the adhesive layer to the plastic surface. The post bake, that is the heating of the article after application of the copper or equivalent film primarily effects a strong bond between the adhesive layer and the metal film presumably due to the fact that the higher coefficient of expansion of the plastic as compared with the metal layer, places the film of adhesive under compression during the heat treatment. As the thermoplastic components of the adhesive layer retain their elasticity during and following this bake, it is believed that this retained elasticity is essential to the production of a strong stress and shock resistant adhesion between the metal film and the plastic surface.

The success of the post bake in applying a compressive force to the adhesive layer requires that the plated layer of copper encloses or encapsulates or in other words surrounds the plastic article in order that the expanding plastic can compress the adhesive film against the lower expansion metal film. In other words, the metal film should be a continuous one, as for example, be in the form of a ring or a shell completely or substantially enclosing the plastic part so that at least a major portion of the metal film is in the form of a continuous layer capable of resisting the expansion of the plastic as distinguished for example from a flat metal coated area on only one side or face of a plastic article.

The following are specific examples of what is presently considered as being the preferred process for practicing the present invention, it being understood that the examples are merely illustrative and that the invention is not to be considered as restricted thereto except as indicated in the appended claims.

*Example 1*

A molded acrylonitrile-butadiene-styrene article having a bright, smooth, as-molded surface was subjected to a vapor degreasing operation using ethyl alcohol as the solvent for the purpose of removing from the molded article any residue of the mold lubricant or release agent without affecting the surface finish. After drying the cleaned surface, the article was dipped in a solution of adhesive of the following composition:

| Composition: | Parts by weight |
| --- | --- |
| Acrylonitrile-butadiene copolymer | 3.1 |
| Carboxy-modified acrylonitrile-butadiene copolymer | 3.1 |
| Phenolic resin | 0.7 |
| Titanium dioxide | 3.1 |
| Methyl ethyl ketone | 43.3 |
| Toluene | 25.2 |
| Heptane | 21.5 |

In the above formulation, the suitable carboxy-modified acrylonitrile-butadiene copolymer was one sold under the trade name "Hycar 1072." It is a copolymer containing about 32% acrylonitrile and 68% butadiene modified by the addition of a carboxy modifier in the form of acrylic acid in an amount equal to about three parts per one hundred parts of the acrylonitrile-butadiene component. It is further characterized by specific gravity of about 1.00 and a Mooney viscosity of about 42–62. The acrylonitrile-butadiene copolymer was "Hycar 1001." This copolymer contains about 40% acrylonitrile and 60% butadiene and has a specific gravity of 1.00 and a Mooney viscosity of 85–115. The phenolic resin was a non-curing thermoplastic phenol-formaldehyde resin sold under the trade name "Durez 12686." The titanium oxide filler had an average particle size of approximately 0.2 to 0.3 micron.

The solution was of a consistency such that an adhesive film having a thickness of approximately 0.0001 to 0.0005 inch was obtained. The adhesive coated article was then prebaked for about 60 minutes at a temperature of 95° C. to remove most or all of the solvent. Thereafter the adhesive film was sensitized by immersion for a few minutes in an acid stannous chloride solution, rinsed in water, and then activated by immersion in an acid paladium chloride solution. The activated surface was rinsed and immersed in an "Electroless Copper" solution for a period of time sufficient to provide a thin copper coating sufficient to render the surface conductive. By a subsequent application of a copper plate using a standard copper plating bath, a copper plate of a thickness of 0.0008 to 0.0010 inch was applied.

The copper plated article was then rinsed and dried and subjected to a post bake for about 30 minutes at 70° C. for the purpose of effecting a relatively high degree of bonding of the metal layer to the plastic surface. Following the post bake operation, the metal surface was cleaned by a reverse current alkali treatment, rinsed, acid treated to neutralize the alkali and further rinsed. The copper surface was then plated using standard nickel and chromium plating baths to apply a nickel plate having a thickness of from 0.00015 to 0.0003 inch and a chromium plate of approximately 0.00001 inch. The resultant chromium plated plastic article was characterized by comparatively thin electroplated coating of metal having the same smooth surface finish of the as-molder plastic base. Peel strengths of approximately 10–12 pounds/inch were consistently obtained in an Instron=180° peel test at ½ inch per minute travel.

*Example 2*

The entire surface of a molded phenolic resin article after being cleaned by alkali immersion, water rinsing and drying was sprayed with an adhesive solution of the following composition:

| Composition: | Parts by weight |
| --- | --- |
| Acrylonitrile-butadiene copolymer | 2.1 |
| Carboxy-modified acrylonitrile-butadiene copolymer | 2.1 |
| Phenolic resin | 1.2 |
| Titanium dioxide | 2.1 |
| Methyl ethyl ketone | 14.0 |
| Methyl isobutyl ketone | 12.0 |
| 2-nitropropane | 35.0 |
| Cyclohexane | 20.0 |
| Cellosolve | 10.0 |
| Isopropyl alcohol | 0.5 |
| N-butanol | 1.0 |
| Total | 100.0 |

The resins and filler were the same as those used in Example 1, the solvent mixture being selected to provide the desired spray characteristics of the solution for spray application. After application of the solution, the coated article was baked for 45 minutes at 145° C. This was followed by application of a copper layer as described in Example 1, a post-bake for 30 minutes at 100° C., and finally the application of a nickel-chromium plate. The resultant plate had a peel strength of 6–8 pounds per inch.

It will be appreciated that any metal which may be chemically or electrolytically deposited on a non-conductive surface following the usual practices can be employed in the practice of the present invention and also that various other changes and modifications may be made

What I claim as new and desire to secure by Letters Patent of the United States is:

1. The process of providing a molded plastic article with an electro-deposited metal coating which comprises:

applying to the surface of the molded plastic article a thin adhesive coating consisting essentially of (a) two parts by weight of a carboxy modified acrylonitrile-butadiene copolymer resin, (b) from one to three parts by weight of a 40–60 acrylonitrile-butadiene copolymer resin, (c) one to two parts of a non-curing phenolic resin, (d) an inorganic filler in the ratio of about one part by weight of filler to two to four parts by weight of (a), (b) and (c), and a solvent for said resins, drying said coating at an elevated temperature sufficient to remove substantially all of the solvent, sensitizing, activating, and applying an electroless copper conductor to said activated coating, electroplating a thin copper layer on said electroless copper, heating said metal coated article to a temperature of at least 75° C., and thereafter electroplating a finish metal coating on said copper layer.

2. The process of providing a molded acrylonitrile-butadiene-styrene plastic article with an electro-deposited metal coating which comprises:

applying to the surface of the molded plastic article a thin adhesive coating consisting essentially of about (a) 3.1 parts by weight of a carboxy modified acrylonitrile-butadiene copolymer, (b) 3.1 parts by weight of a 40–60 acrylonitrile-butadiene copolymer, (c) 0.7 part of a non-curing thermoplastic phenolic resin, (d) about 3.1 parts by weight of a titanium dioxide filler and a solvent for said copolymers, drying said coating at an elevated temperature of about 95° C. for a time sufficient to remove substantially all of the solvent, sensitizing, activating, and applying an electroless copper conductor to said activated coating, electroplating a thin layer of copper on said electroless copper, heating said metal coated article to a temperature of about 70° C., and thereafter electroplating a finish metal coating on said copper layer.

3. The process of providing a molded phenolic resin article with an electro-deposited metal coating which comprises:

applying to the surface of the molded plastic article a thin adhesive coating consisting essentially of (a) 2.1 parts by weight of a carboxy modified acrylonitrile-butadiene copolymer resin, (b) from 2.1 parts by weight of a 40–60 acrylonitrile-butadiene copolymer resin, (c) about 1.2 parts of a thermoplastic phenolic resin, (d) about 2.1 parts by weight of titanium dioxide and a solvent for said resins, drying said coating at a temperature of about 145° C., sensitizing, activating, and applying an electroless copper conductor to said activated coating, electroplating a thin layer of bright copper on said electroless copper, heating said copper coated article to a temperature of about 100° C., and thereafter electroplating a final metal coating on said copper layer.

References Cited by the Examiner

UNITED STATES PATENTS

| | | | |
|---|---|---|---|
| 2,006,553 | 7/1935 | Hennigan | 204—22 |
| 2,689,191 | 9/1954 | Pessel | 117—160 |
| 2,728,693 | 12/1955 | Cado | 204—20 |
| 2,917,439 | 12/1959 | Liu | 204—22 |
| 3,116,159 | 12/1963 | Fisher et al. | 117—76 |
| 3,259,559 | 7/1966 | Schneble et al. | 204—38 |

JOHN H. MACK, *Primary Examiner.*

T. TUFARIELLO, *Assistant Examiner.*